(12) United States Patent
Sherony (10) Patent No.: US 9,598,049 B2
(45) Date of Patent: Mar. 21, 2017

(54) HANDS FREE ACCESS SYSTEM FOR A VEHICLE CLOSURE

(71) Applicant: Toyota Motor Engineering & Manufacturing North America, Inc., Erlanger, KY (US)

(72) Inventor: Rini Sherony, Ann Arbor, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 88 days.

(21) Appl. No.: 14/326,496

(22) Filed: Jul. 9, 2014

(65) Prior Publication Data
US 2016/0012654 A1    Jan. 14, 2016

(51) Int. Cl.
| | | |
|---|---|---|
| *H04N 7/18* | (2006.01) |
| *E05B 65/12* | (2006.01) |
| *G06F 17/00* | (2006.01) |
| *G07C 9/00* | (2006.01) |
| *G06K 9/00* | (2006.01) |
| *B60R 25/20* | (2013.01) |
| *B60R 25/25* | (2013.01) |

(52) U.S. Cl.
CPC .......... *B60R 25/2054* (2013.01); *B60R 25/25* (2013.01); *G07C 9/00087* (2013.01); *G07C 9/00309* (2013.01); *G07C 2009/00793* (2013.01); *G07C 2209/64* (2013.01)

(58) Field of Classification Search
CPC . H04N 7/18; E05B 65/12; E05F 15/00; G06F 17/00; G07C 9/00032; G07C 9/00111
USPC ..... 340/5.61, 5.2, 5.8, 5.72; 341/173; 49/25, 49/506; 701/2, 36, 207
See application file for complete search history.

(56) References Cited

U.S. PATENT DOCUMENTS

| | | | |
|---|---|---|---|
| 5,929,769 A * | 7/1999 | Garnault | B60R 25/2009 340/12.51 |
| 6,993,157 B1 * | 1/2006 | Oue | B60R 25/2045 348/169 |
| 8,091,280 B2 * | 1/2012 | Hanzel | B60R 25/2054 296/146.4 |
| 8,228,166 B2 | 7/2012 | Eberhard | |
| 8,717,429 B2 * | 5/2014 | Giraud | E05B 81/78 348/77 |
| 9,050,943 B2 * | 6/2015 | Muller | B60R 25/246 |
| 9,214,083 B2 * | 12/2015 | Lim | G08C 17/02 |
| 9,234,742 B2 * | 1/2016 | Bridges | G01B 11/002 |
| 2001/0054952 A1 | 12/2001 | Desai et al. | |
| 2011/0118946 A1 | 5/2011 | Reimann et al. | |
| 2011/0248820 A1 | 10/2011 | Gehin | |
| 2011/0276234 A1 | 11/2011 | Van Gastel | |
| 2012/0169880 A1 | 7/2012 | Williamson | |

(Continued)

*Primary Examiner* — Nam V Nguyen
(74) *Attorney, Agent, or Firm* — Christopher G. Darrow; Darrow Mustafa PC (57) ABSTRACT

A method of operating a hands free access system for a vehicle includes authenticating a user of the vehicle, determining whether the authenticated user is burdened, and selectively opening a vehicle closure in response to the determination. A hands free access system for a vehicle includes a user recognition system operable to authenticate a user of the vehicle and a control system operable to determine whether the authenticated user is burdened and to operate the vehicle closure in response to the determination.

18 Claims, 6 Drawing Sheets

(56) References Cited

U.S. PATENT DOCUMENTS

| | | | |
|---|---|---|---|
| 2012/0249291 A1* | 10/2012 | Holcomb | G07C 9/00563 340/5.51 |
| 2014/0169139 A1 | 6/2014 | Lee | |
| 2014/0324298 A1* | 10/2014 | Reime | G01V 8/20 701/49 |
| 2014/0347479 A1* | 11/2014 | Givon | G06K 9/00342 348/143 |
| 2015/0081167 A1* | 3/2015 | Pisz | B60H 1/00642 701/36 |
| 2015/0180999 A1* | 6/2015 | Pisz | B60K 35/00 709/204 |
| 2015/0193107 A1* | 7/2015 | Schwesinger | G06F 3/0485 715/784 |
| 2015/0336521 A1* | 11/2015 | Tofilescu | B60R 16/023 382/104 |

\* cited by examiner

HANDS FREE ACCESS SYSTEM FOR A VEHICLE CLOSURE

BACKGROUND

The present disclosure relates to a vehicle, and, more particularly, to a hands free access system for a vehicle closure.

Numerous hands free access systems automatically open vehicle closures in response to a remote key fob. More recently, some systems utilize a gesture. Although at least somewhat effective, such gestures may be inconvenient, and perhaps difficult, for some users to operate.

SUMMARY

The hands free access system described herein increases convenience through automatic opening of an appropriate vehicle closure when a burdened user approaches the vehicle. The hands free access system utilizes image data of the user to identify and authenticate the user. The image data also allows the hands free access system to further determine the type of burden to open an appropriate vehicle closure without a gesture or other action by the user.

A computer storage media having embodied thereon computer-useable instructions that, when executed, perform a method, the method according to one disclosed non-limiting embodiment, includes authenticating a user of the vehicle, determining whether the authenticated user is burdened and selectively opening a vehicle closure in response to the determination.

A hands free access system for a vehicle according to another disclosed non-limiting embodiment includes a user recognition system operable to authenticate a user of the vehicle. A control system is in communication with the user recognition system and is operable to determine whether the authenticated user is burdened. A vehicle closure is then operated in response to the determination.

The foregoing features and elements may be combined in various combinations without exclusivity, unless expressly indicated otherwise. These features and elements, as well as the operation thereof, will become more apparent in light of the following description and the accompanying drawings. It should be understood, however, that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

A hands free access system for a vehicle is disclosed. The hands free access system increases convenience through automated opening of an appropriate vehicle closure when a burdened user approaches the vehicle. The hands free access system utilizes image data from a vehicle backup camera system to identify and authenticate the user with minimal, if any, additional hardware as many vehicles presently include a vehicle backup camera system. The image data such as video permits analysis of a skeletal joint relationship to determine if the user is burdened. The image data also permits recognition of the type of burden to open the appropriate closure such as a sliding van door when a child is recognized as compared to trunk when a shopping cart or package is recognized.

Figure 1:
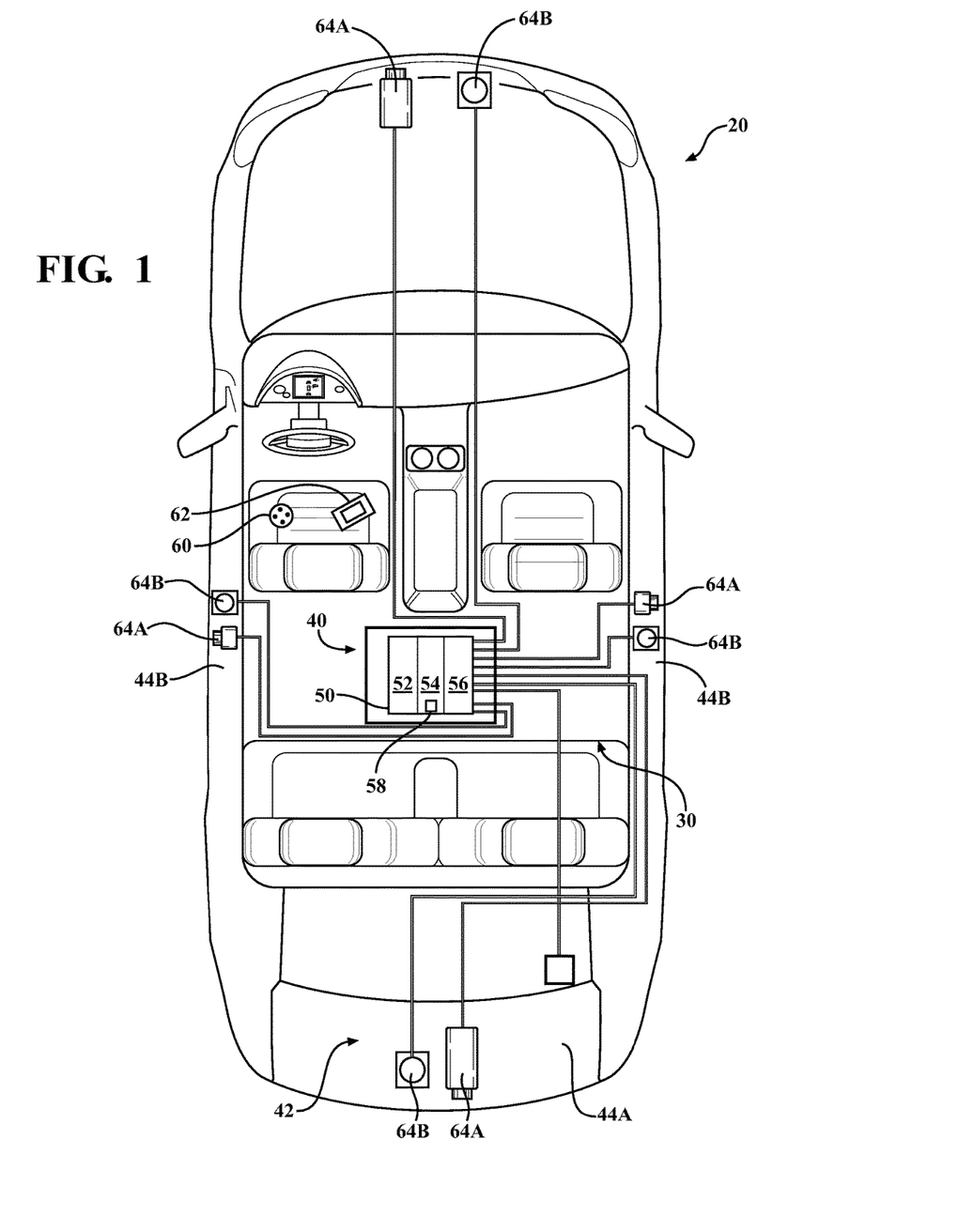
FIG. 1 is a schematic of an example vehicle for use with a hands free access system according to one non-limiting embodiment.

FIG. 1 schematically illustrates a vehicle 20 with a hands free access system 30. The hands free access system 30 generally includes a control system 40, a user recognition system 42, and a vehicle closure 44 such as a vehicle trunk 44A, door 44B, etc. It should be appreciated that although particular systems are separately defined, each or any of the systems may be otherwise combined or segregated via hardware and/or software of the hands free access system 30.

The control system 40 generally includes a control module 50 with a processor 52, a memory 54, and an interface 56. The control module 50 may be a portion of a central vehicle control, a stand-alone unit or other system such as a cloud-based system. The processor 52 may be any type of microprocessor having desired performance characteristics. The memory 54 may include any type of computer readable medium that stores the data and operational software for the processor 52 as well as the control algorithms described herein below such as a hands free access system algorithm 58. The interface 56 facilitates communication with other systems such as the user recognition system 42 and the vehicle closure 44. The interface 56 may also provide for communication with wireless devices such as a key fob 60 and/or a personal electronic device 62 of the user, e.g. a tablet, smart phone, or other mobile device.

Figure 2:
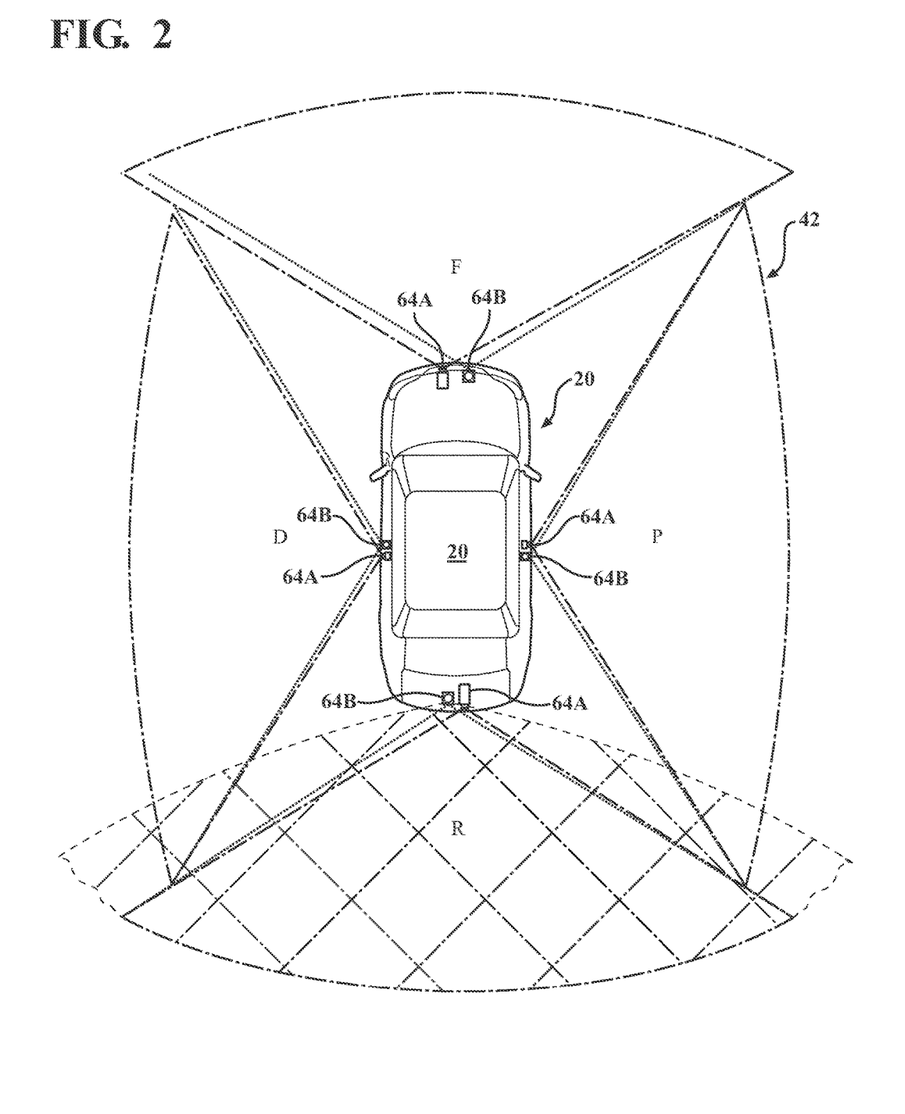
FIG. 2 is a schematic of a view provided by the hands free access system.

The user recognition system 42 may include one or more first sensors 64A and/or one or more second sensors 64B around the vehicle 20 to provide a desired field of view. The field of view of adjacent sensors 64A, 64B in the user recognition system 42 may overlap to provide a 360 degree view around the vehicle 20 (also shown in FIG. 2). Alternatively, it should be appreciated that the field of view may cover only, for example, the rear quadrant of the vehicle 20 as is typically provided by a vehicle backup camera system that is alternatively referred to as a reversing camera or a rear view camera. Examples of first sensors 64A include, but are not limited to, video cameras, charge coupled devices, forward looking infrared, thermal systems and/or other imaging sensors and combinations thereof. Examples of second sensors 64B include, but are not limited to, RADAR, SONAR, LIDAR and/or other distance measurement sensors and combinations thereof.

Figure 3:
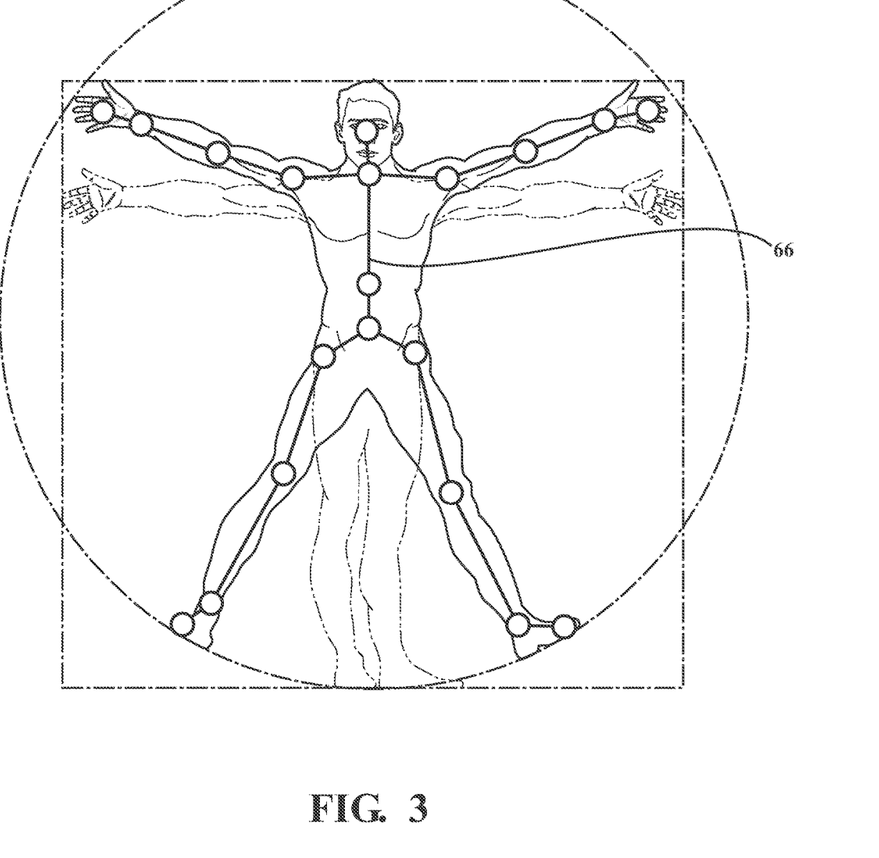
FIG. 3 is a schematic view illustrating user recognition via a skeletal joint relationship.

The user recognition system 42 is operable to recognize a user such as the driver and/or passenger based on image data captured by the first sensor 64A, through, for example, a skeletal joint relationship 66 (FIG. 3) when the user approaches to within a predetermined distance as determined by the second sensor 64B. Separate from, or in association with, visual recognition, wireless devices such as the key fob 60 and/or personal electronic device 62 associated with the particular driver and/or passenger may be utilized to identify and/or further authenticate the user.

Registration of various users with the hands free access system 30 can be completed in various ways such as via the Internet or with a direct vehicle interface. Based at least in part on this authentication, the hands free access system 30 provides access to the vehicle 20 for the authenticated user. In one disclosed non-limiting embodiment, the hands free access system 30 utilizes a multi-factor authentication for security and authorization. Example multi-factor authentication may include the key fob 60 and the skeletal joint relationship 66. The user may be provisionally identified with one of these factors, but at least two factors may be required to authenticate the user and ensure the security of the vehicle 20. It should be appreciated that various authentication methods may be utilized.

The key fob 60 may be encrypted to uniquely identify each user to the hands free access system 30. Additional security protocols such as a rolling time key to ensure that even the encrypted key fob 60 cannot be intercepted and re-used by unauthorized devices may additionally be utilized. The hands free access system 30 in this disclosed non-limiting embodiment allows pre-authenticated access at about 30-40 feet from the vehicle 20 and closure 44 access at about 15-25 feet from the vehicle 20.

Figure 4:
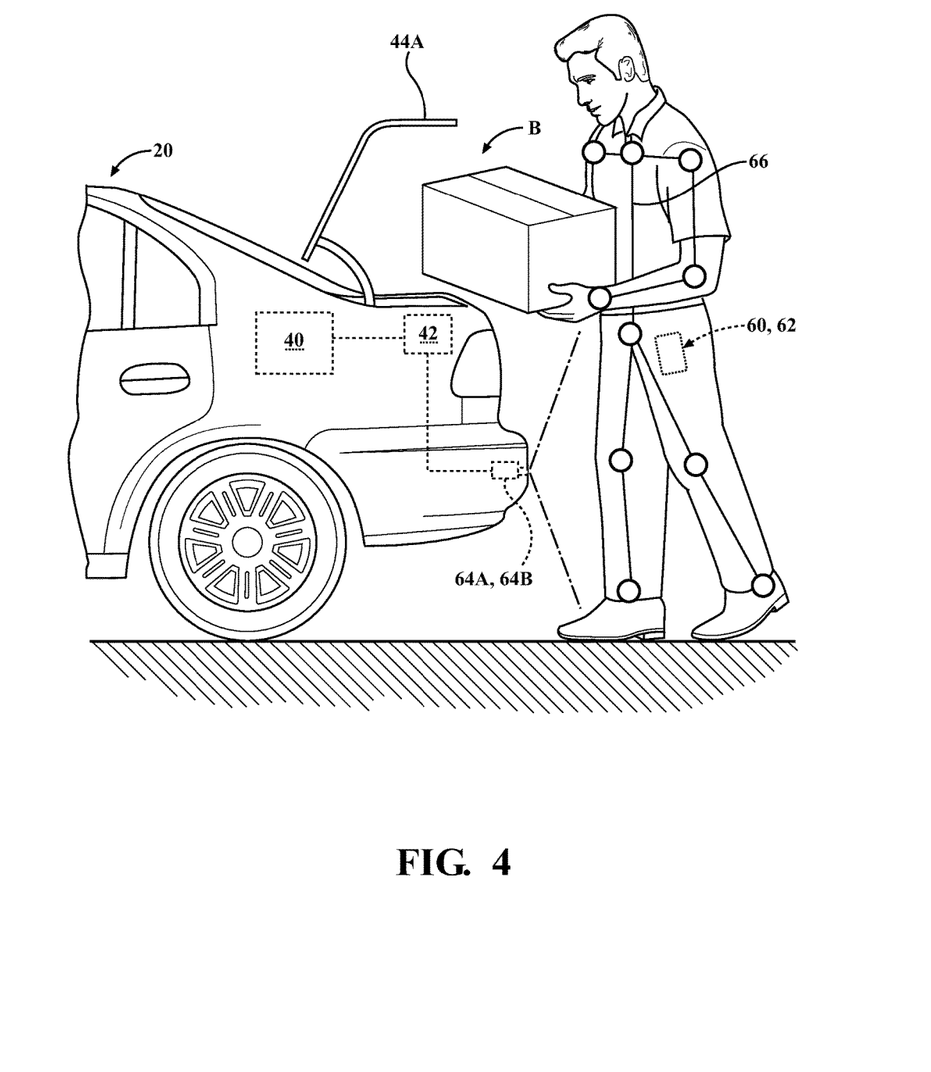
FIG. 4 is a schematic view of the vehicle illustrating a burdened user.

With respect to FIG. 4, to provide further identification and/or authentication, the hands free access system 30 is operable to recognize a user by their skeletal joint relationship 66. The skeletal joint relationship 66 in this disclosed non-limiting embodiment may be utilized to facilitate pre-authentication but not full authentication that grants full access to the vehicle 20. However, if the user has been pre-authenticated via the key fob 60, a matching skeletal joint relationship 66 will fully authenticate the user. That is, the user recognition system 42 may utilize the skeletal joint relationship 66 as the second point of identification.

Figure 5:
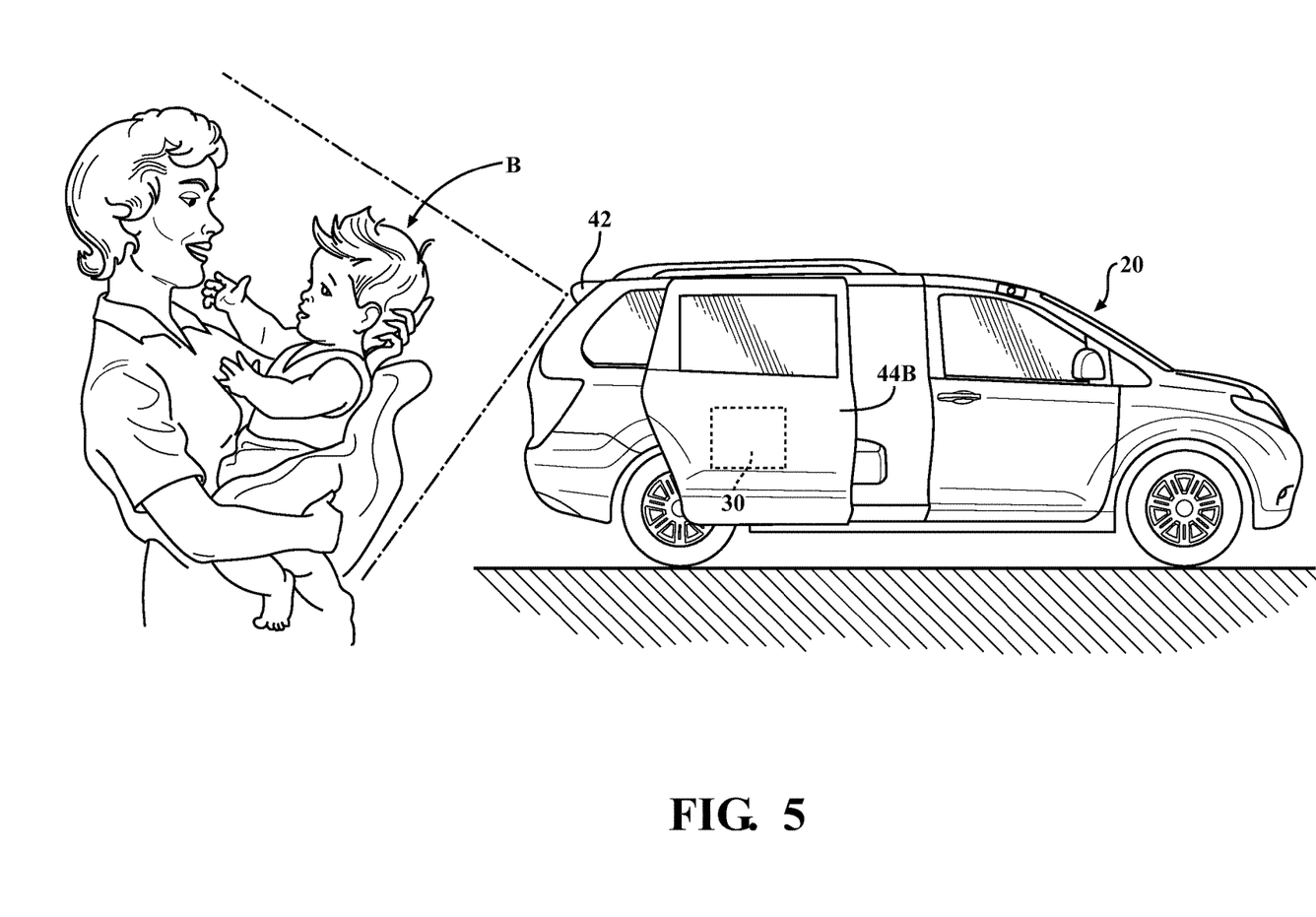
FIG. 5 is another schematic view of the vehicle illustrating a burdened user.

Further, the control module 50 is operable to utilize the image data from the first sensor 64A via the user recognition system 42 to identify whether the authenticated driver and/or passenger is burdened B. That is, during a "walk up" to the vehicle 20, the hands free access system 30 authenticates the driver and/or passenger and then determines if the authenticated user is burdened B. In this disclosed non-limiting embodiment, arrangement of the skeletal joint relationship 66 may also be utilized to facilitate determination as to whether the user is burdened B. As defined herein, "burdened" is a circumstance in which an automatically opened vehicle closure 44 would be convenient for the user. For example, the hands free access system 30 may detect that the authenticated user is carrying a box (FIG. 4), a child (FIG. 5), pushing a shopping cart, or carrying a luggage, or other burden that would otherwise make it difficult for the authenticated driver and/or passenger to utilize the key fob 60 to unlock/open the vehicle 20. To facilitate determination of whether the user is burdened B, the hands free access system 30 can further include depth-sensing features, such as those found in the Microsoft Kinect™ system, described in U.S. Pat. No. 8,638,985 to Shotton, et. al. and U.S. Pat. No. 8,487,938 to Latta, et. al., which are hereby fully incorporated into this application by reference.

The hands free access system 30 may be further operable to determine with what the authenticated user is burdened B and thereby open the appropriate vehicle closure 44, e.g., a sliding van door 44B when a child is recognized (FIG. 5) as compared to trunk 44A when a shopping cart or box is recognized (FIG. 4). This distinction may be further facilitated when the user registers with the hands free access system 30, e.g., the user has a child of a certain age, and/or the user is to be visually recognized with the burden B.

Figure 6:
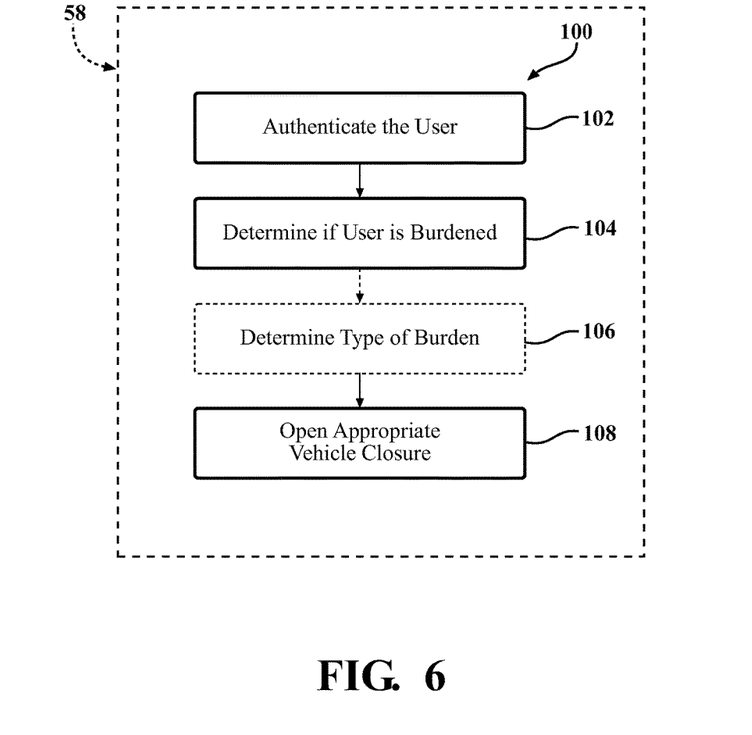
FIG. 6 is a schematic block diagram of an algorithm for operation of the system according to one non-limiting embodiment.

With reference to FIG. 6, in one disclosed non-limiting embodiment, the algorithm 58 for operation of the hands free access system 30 is schematically illustrated. The functions of the algorithm 58 are disclosed in terms of functional block diagrams, and it should be appreciated that these functions may be enacted in either dedicated hardware circuitry or programmed software routines as a computer readable storage medium capable of execution as instructions in a microprocessor based electronics control embodiment such as the control system 40. That is, the memory 54 is an example computer storage media having embodied thereon computer-useable instructions such as the algorithm 58 that, when executed, performs a method 100 of personalized route guidance.

The algorithm 58 provides a method 100 for hands free access to the vehicle 20. Initially, the method 100 authenticates the user (step 102). Next, the hands free access system 30 determines whether the authenticated user is burdened B (step 104). Optionally, the hands free access system 30 determines the type of burden (step 106). Finally, the hands free access system 30 opens the appropriate vehicle closure 44 (step 108).

The use of the terms "a", "an", "the", and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed:

1. A method of hands free access for a vehicle, comprising:
   authenticating a user of a vehicle having at least one vehicle closure;
   determining whether or not the user is burdened with an object without requiring the user to perform a gesture; and
   when it is determined that the user is burdened with an object, opening the at least one vehicle closure in response to the determination.

2. The method as recited in claim 1, wherein the authenticating includes:
   identifying a skeletal joint relationship for the user, and
   utilizing a match between the identified skeletal joint relationship and that of the user to authenticate the user.

3. The method as recited in claim 1, wherein the authenticating includes utilizing at least one of a personal electronic device and a key fob of the user.

4. The method as recited in claim 1, wherein the determining includes:
   identifying an arrangement of a skeletal joint relationship for the user, and
   determining whether or not the user is burdened with an object via the arrangement of the skeletal joint relationship, but not based on whether the skeletal joint relationship reflects the user performing a gesture.

5. The method as recited in claim 1, wherein the determining includes distinguishing a type of the object from among a plurality of different types of objects.

6. The method as recited in claim 1, wherein the vehicle has first and second vehicle closures, the determining includes distinguishing between first and second types of objects, and the opening includes:
   if it is determined that the user is burdened with a first type of object, opening the first vehicle closure, and
   if it is determined that the user is burdened with a second type of object, opening the second vehicle closure.

7. The method as recited in claim 1, wherein the determining includes determining whether the user is carrying the object.

8. A hands free access system for a vehicle, comprising:
   a user recognition system operable to authenticate a user of a vehicle;
   at least one vehicle closure; and
   a control system in communication with the user recognition system and the at least one vehicle closure, the control system operable to:
   determine whether or not the user is burdened with an object without requiring the user to perform a gesture, and
   when it is determined that the user is burdened with an object, opening the at least one vehicle closure to open in response to the determination.

9. The system as recited in claim 8, wherein the at least one vehicle closure is at least one of a trunk and a door.

10. The system as recited in claim 8, wherein the user recognition system includes a multiple of sensors, and at least one of the multiple of sensors is a distance measurement sensor.

11. The system as recited in claim 8, wherein the user recognition system includes a multiple of sensors, and at least one of the multiple of sensors is a backup camera.

12. The system as recited in claim 8, wherein the user recognition system includes a multiple of sensors directed only toward a rear quadrant of the vehicle.

13. The system as recited in claim 8, wherein the user recognition system is operable to:
   identify a skeletal joint relationship for the user, and
   authenticate the user of the vehicle via a match between the identified skeletal joint relationship and that of the user.

14. The system as recited in claim 8, wherein the user recognition system is operable to authenticate the user of the vehicle via at least one of a personal electronic device and a key fob of the user.

15. The system as recited in claim 8, wherein the control system is operable to:
   identifying an arrangement of a skeletal joint relationship for the user, and
   determine whether or not the user is burdened with an object via the arrangement of the skeletal joint relationship, but not based on whether the skeletal joint relationship reflects the user performing a gesture.

16. The system as recited in claim 8, wherein the control system is operable to distinguish a type of the object from among a plurality of different types of objects.

17. The system as recited in claim 8, wherein the vehicle has first and second vehicle closures, the determining includes distinguishing between first and second types of objects, and the opening includes:
   if it is determined that the user is burdened with a first type of object, opening the first vehicle closure, and
   if it is determined that the user is burdened with a second type of object, opening the second vehicle closure.

18. The system as recited in claim 8, wherein the determining includes determining whether the user is carrying the object.

* * * * *

UNITED STATES PATENT AND TRADEMARK OFFICE
CERTIFICATE OF CORRECTION

PATENT NO. : 9,598,049 B2  
APPLICATION NO. : 14/326496  
DATED : March 21, 2017  
INVENTOR(S) : Sherony Page 1 of 1

It is certified that error appears in the above-identified patent and that said Letters Patent is hereby corrected as shown below:

In the Specification

Column 4, Line 1: replace "compared to trunk" with -- compared to the trunk --

In the Claims

Column 5, Line 25: replace "via the arrangment" with -- via the identified arrangement --
Column 6, Lines 2-3: replace "opening the at least one vehicle closure to open in response" with
-- open the at least one vehicle closure in response --
Column 6, Line 30: replace "identifying an arrangement of a" with -- identify an arrangement of a --
Column 6, Line 33: replace "object via the arrangement" with -- object via the identified arrangement --

Signed and Sealed this
Seventh Day of November, 2017

Joseph Matal
*Performing the Functions and Duties of the*
*Under Secretary of Commerce for Intellectual Property and*
*Director of the United States Patent and Trademark Office*